May 21, 1940.   J. D. CHAMBERLIN   2,201,477
STEERING COLUMN BUSHING
Filed July 5, 1938
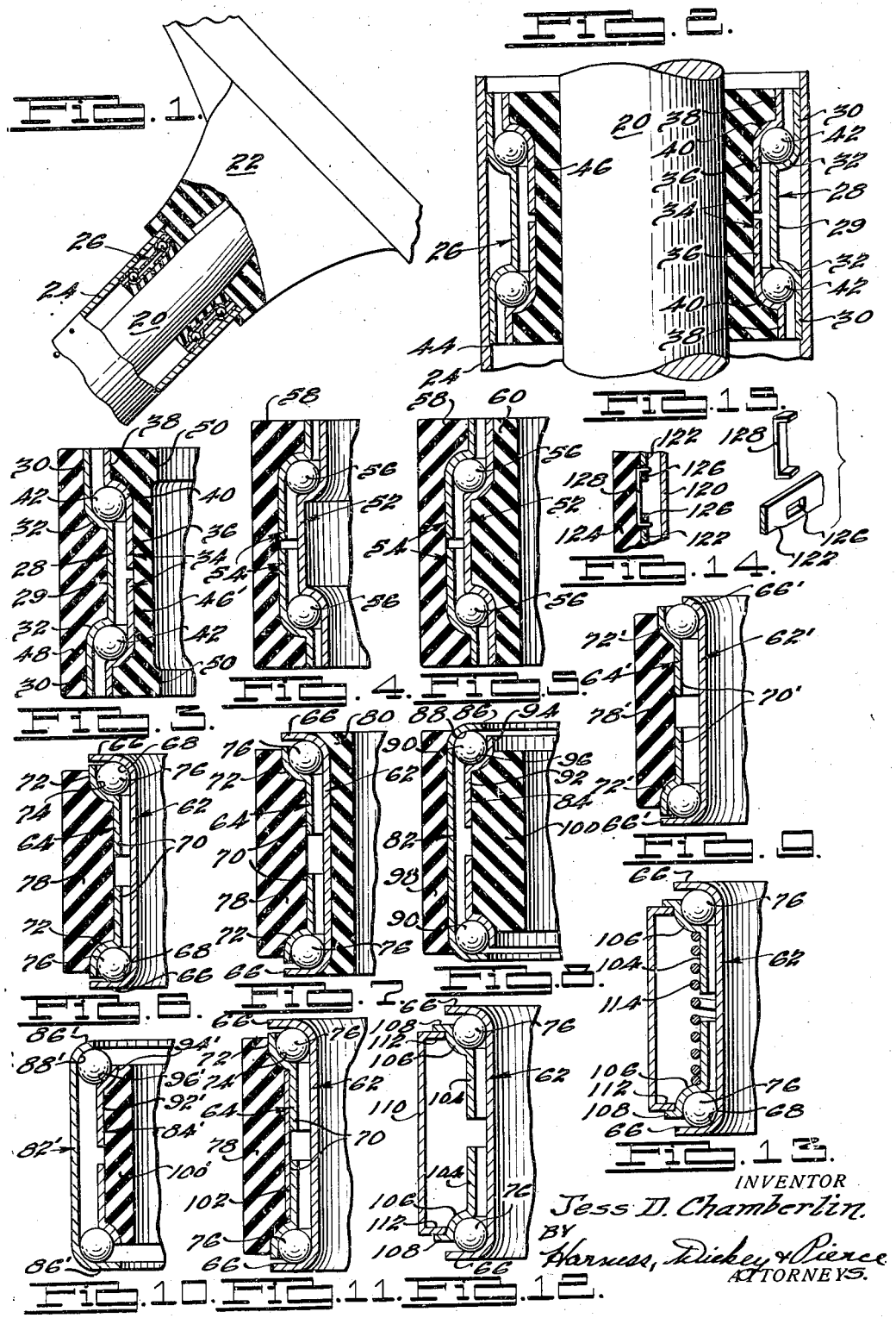
INVENTOR
Jess D. Chamberlin
BY
Harness, Dickey & Pierce
ATTORNEYS.

Patented May 21, 1940

2,201,477

UNITED STATES PATENT OFFICE 2,201,477

STEERING COLUMN BUSHING

Jess D. Chamberlin, Detroit, Mich.

Application July 5, 1938, Serial No. 217,440

9 Claims. (Cl. 308—184)

This invention relates to bushings or bearings of the type adaptable for use in connection with the steering gear of a motor vehicle, and for other similar uses, the principal object being the provision of a bushing or bearing of this type that is relatively simple in construction, efficient in operation and economical to produce.

Objects of the invention include the provision of a novel form of anti-friction bearing or bushing including novel means constantly acting to take up any wear occurring between the parts thereby to prevent rattling thereof; the provision of a bushing or bearing of the type described which is adapted to fit shafts having a large tolerance in its diametrical dimension; the provision of a bushing or bearing of the type described so constructed and arranged as to permit it to be inserted in openings or bores having relatively large tolerance in diametrical dimensions; the provision of a bushing or bearing of the type described the principal parts of which may be readily formed from sheet metal or thin walled tubing; the provision of a bearing or bushing of the type described including inner and outer telescoping portions, one of which is integral and formed to provide a pair of oppositely disposed raceways and the other of which comprises a pair of separately formed parts each formed to provide a raceway lying in opposed relation with respect to one of the first mentioned raceways, together with rolling anti-friction means between the raceways and means constantly urging the separately formed portions to a position to grip the anti-friction elements between the cooperating raceways; the provision of a bushing or bearing including anti-friction elements and inner and outer race forming members, one of the race forming members comprising two axially separable parts, and a yieldable ring cooperating with the axially separable parts adapted, when radially compressed, to urge the axially separated members axially with respect to one another whereby to cause the anti-friction members to be gripped between their respective races; the provision of a bushing or bearing of the type described in which the yieldable ring additionally permits slight misalignment between the two parts joined by the bearing without subjecting the bearing to unnecessarily severe binding stresses; the provision of a bushing or bearing of the type described in which means are provided for positively preventing undue relative axial movement of the axially separable parts of the bearing; and the provision of an anti-friction bearing including pairs of axially spaced raceways and rolling anti-friction elements disposed between each pair of raceways and so constructed and arranged as to permit unusual ease in the assembly of the same.

The above being among the objects of the present invention the same consists in certain novel features of construction and combinations of parts to be hereinafter described with reference to the accompanying drawing, and then claimed, having the above and other objects in view.

In the accompanying drawing, which illustrates suitable embodiments of the present invention and in which like numerals refer to like parts throughout the several different views;

Figure 1 is a partially broken, partially sectioned fragmentary side elevational view of the upper end of the steering gear for a motor vehicle, showing a bushing constructed in accordance with the present invention interposed between the steering shaft and the mast jacket thereof, the bearing being shown in section;

Fig. 2 is an enlarged fragmentary sectional view of that portion of the steering gear shown in Fig. 1 including the bushing in question, the bushing being shown in section taken in a plane passing through the axis thereof;

Figs. 3 to 13 inclusive are fragmentary sectional views taken in the same plane as Fig. 2, illustrating modified forms of bushing or bearing construction;

Fig. 14 is a fragmentary sectional view illustrating the use of a fastening means between the axially separable parts of the bearing and which is adaptable for use in connection with any of the bearings shown in the previous views;

Fig. 15 is a perspective view showing one of the fastening elements and a portion of one of the bearing elements formed to cooperate therewith, of the construction illustrated in Fig. 14.

Referring to Fig. 1, the steering shaft of a steering gear for a motor vehicle is illustrated at 20 and as having suitably secured to the upper end thereof in a conventional manner a suitable or conventional steering wheel 22. Below the steering wheel 22 the steering shaft 20 is surrounded by a tubular cylindrical mast jacket or steering column 24 arranged in concentric and generally radially spaced relation with respect thereto. A steering column bushing indicated generally at 26 is interposed between the upper end of the mast jacket 24 and the shaft 20 to rotatably support the upper end of the shaft 20 therein.

Referring to Fig. 2 the bushing or bearing there shown comprises a one-piece outer member or portion indicated generally at 28 which may be economically formed from sheet metal or thin walled tubing to provide a hollow cylindrical central portion 29 and radially outwardly offset axially extending hollow cylindrical end portions 30, each of which is joined at its axially inner end with the central portion 29 by means of an annular wall 32 of curved cross-sectional configurations, the radially inner face of which provides a bearing race.

Positioned interiorly of the member 28 is a pair of identical members indicated generally at 34 each comprising a hollow cylindrical portion 36 of a diameter smaller than and telescopically received within the cylindrical portion 29 of the outer member 28 and a radially outwardly axially offset hollow cylindrical portion 38, the portions 36 each being joined to its corresponding portion 38 through an annular wall portion 40 of curved cross-sectional configurations, the radially outer surface of each of which also forms a bearing race. The members 34 are arranged in axially aligned relation with the free ends of the portions 36 in opposed relationship so as to bring the race forming portion 40 of each thereof in opposed relation with respect to the race forming portions 32 of the outer member 28, and between the bearing race of each of the inner members 34 and the corresponding bearing race of the outer member 28 is received a row of ball bearings 42.

In the particular construction shown in Fig. 2 the external diameters of the portions 30 of the outer member 28 are of a size to be received, preferably by a light press-fit, within the upper end of the steering column or mast jacket 24. The upper end of the mast jacket 24 in such case is preferably reamed out over a depth required to receive the bearing 26 so as to form a shoulder 44 for engagement with the lower end of the member 28 and thereby locate the bushing or bearing assembly within the mast jacket 24.

Also in the construction illustrated in Fig. 2 the internal diameters of the members 34 are substantially greater than the external diameter of the steering shaft 20, and interposed between the members 34 and the steering shaft 20 is an annular layer or ring of material 46. In the broader aspects of the present invention the material 46 may be any suitable readily yieldable or resilient material such as felt, fabric, or the like but is preferably formed from rubber, its peripheral outer surface being formed for complementary engagement with the inner surfaces of the member 34 as indicated. Initially the internal diameter of the ring 46 is preferably made smaller than the outer diameter of the shaft 20 so that when the assembly is pressed upon the shaft 20 the material from which the ring is formed will be compressed and this compression will exert a stress in the material of the ring 46 which will tend to force the two members 34 toward one another and thereby cause the ball bearings 42 to be firmly gripped between their respective race members. Particularly where the material of the ring 46 is resilient this effect will tend to maintain the gripping effect of the races upon the ball bearings 42 and automatically take up any such wear as might develop between them and thereby preventing rattling of the parts. Furthermore, where the material of the ring 46 is sufficiently yieldable or flexible, it will be appreciated that the axes of the shaft and mast jacket 24 may be slightly misaligned without any serious effect on the bushing or bearing assembly which will continue to function in the desired manner. The use of material of a yieldable or resilient nature for the ring 46 also permits the use of shafts 20 which have relatively large tolerances in their external dimensions, thus effecting a saving in the cost of material.

As previously mentioned, the members 28 and 34 may be made from sheet metal or from thin-walled tubing and may be suitably case-hardened or otherwise hardened before assembly. Assembly of the bushing or bearing is an exceedingly simple matter inasmuch as the members 34 may be axially withdrawn from the member 28 a sufficient distance to permit insertion of the ball bearings 42 after which the members 34 may be moved into operative position. Ordinarily the ring 46 will be formed separately, collapsed and inserted within the member 34, and then expanded into position in which it will hold the members 34 against separation and therefore the bearing in assembled condition. Where the ring 46 is formed of rubber it may of course, if desired, be molded in position and in any event vulcanized to the inner faces of the members 34, but ordinarily this added trouble and expense will not be found necessary. It will be appreciated that the ring 46, being of a yieldable and non-metallic nature, will act to dampen the transmission of audible sounds between the shaft 20 and mast jacket 24.

In Fig. 3 a modified form of construction is shown in which all of the elements of the bearing illustrated in Fig. 2 are employed but in this case the maximum external dimensions of the outer member 28 are less than the internal dimensions of the mast jacket 24, or other part which is to receive the bushing or bearing. In such case an annular layer 48 of material is provided in surrounding relationship with respect to the outer surface of the member 28, the bore of the member 48 being formed for complementary engagement with the outer surfaces of the member 28. As in the case above described in connection with the ring 46, the annular layer or ring 48 may be formed of any suitable yieldable or resilient non-metallic material such as felt, fabric, and preferably rubber, although in the case of the outer ring 48 it is satisfactory in some installation to form it of non-metallic material of relatively rigid characteristics but preferably of some such material that is relatively readily moldable to the form shown. In case the outer ring 48 is made of relatively rigid material it will necessitate its being of a longitudinally split character to permit its assembly around the member 28.

In Fig. 3 a modified form of inner ring 46' is shown. The ring 46' instead of being provided with a cylindrical bore of constant dimension as in the construction illustrated in Fig. 2, has end portions 50, lying inwardly of the portions 38 of the members 34, of smaller internal diameter than the internal diameter of the ring 46' therebetween. In this case the portions 50 may be relied upon in whole or in part to mount the assembly upon the shaft which is to receive it and the material in the portions 50 will thus be subjected to a greater compressive action than the remaining portion of the ring 46, this compressing action tending to expand the material therein in both axial directions and acting against the curved portions 40 of the member 34 to urge the member 34 more forcefully into engagement with each other than in the construction first described. This type of inner ring may also be employed in connection with any of the other modified forms of bushing shown herein in which an inner ring is employed, and a reversal of such construction may be employed for the outer rings.

The construction shown in Fig. 3 will function in substantially the identical manner to that illustrated in Fig. 2 except that in this case it will not be necessary to as closely machine the bore of the member which is to receive the bushing or bearing as in the case of the construction shown in Fig. 2, particularly where the outer layer or ring 48 is of readily yieldable character. This construction also provides two layers of nonmetallic material for insulating the steering shaft 20 from the steering post or mast jacket 24 and thus further aids in damping the audible transmissions of vibrations between these parts to a correspondingly greater degree than the construction illustrated in Fig. 2.

In the construction illustrated in Fig. 4 an inner member or sleeve 52 of integral or one-piece construction and of the same cross-sectional configuration as the outer sleeve 28 in the previously described construction is employed. In this case two outer sleeve members 54 arranged in concentric and generally radially spaced relation with respect to the inner member 52 are provided and these members 54 are of substantially the same cross-sectional configuration as the inner members 34 in the previously described construction. In the construction shown in Fig. 4 the ball bearings 56 corresponding to the ball bearings 42 in the previously described construction are employed in the races formed between the members 52 and 54 in the same manner as previously described. In the construction illustrated in Fig. 4 the inner member 52 is adapted to be received directly upon the shaft 20 preferably with a light press fit, and accordingly this construction calls for the outer diameter of the shaft 20 or equivalent shaft to be relatively accurately controlled as to external dimensions. A ring 58, of suitable non-metallic material and having a bore complementary in shape to the external surfaces of the member 54, surrounds the member 54. The ring 58 may be made of the same material as the ring 48 previously described and where made of non-yieldable material must be diametrically split in order to permit its application to the members 54 except when molded directly thereabout. Preferably, however, the ring 58 is made of rubber, felt or other resilient and/or readily yieldable material and of slightly greater external diameter than the bore in which it is to be received in service so that it will be compressed when applied to the bore and the compressive action thereof will tend to urge the members 54 toward one another thereby to firmly grip the ball bearings 56 between the opposed races of the members 52 and 54. As will be appreciated the construction shown in Fig. 4 will function in a substantially similar manner to the construction illustrated in Fig. 2.

The construction illustrated in Fig. 5 is identical to that illustrated in Fig. 4 except that the inner sleeve member 52, instead of being adapted to be directly received upon its supporting shaft, is provided with an inner layer 60 of a material which may be identical in all respects to the layers 46 and 46' illustrated and described in connection with Figs. 2 and 3. As will be apparent the construction illustrated in Fig. 5 is substantially similar to that illustrated in Fig. 3 except the outer sleeve member, instead of the inner sleeve member is split or separated axially thereof into two parts, but the mode of operation will be substantially similar.

In Fig. 6 is shown a modified form of construction including an inner sleeve portion indicated generally at 62 and an outer sleeve portion indicated generally at 64. The inner sleeve portion 62 comprises a one-piece, integral generally cylindrical body portion, the opposite axial ends of which are outwardly turned as at 66 to form a curved annular raceway 68 at each end thereof. The outer portion 64 is formed of two identical axially separated parts each including a generally cylindrical main body portion 70 and a radially outwardly and axially outwardly curved end portion 72 forming internally thereof a curved annular raceway 74, the raceway 74 of each member 70 being arranged in opposed relation to one of the raceways 68 of the inner member 62. A plurality of balls 76 are arranged between each opposed pair of raceways. In the construction shown in Fig. 6 the inner sleeve member or portion 62 is adapted to be received directly upon the cooperating shaft 20, or other shaft to be received therein, but the outer portion 64 is surrounded by a layer 78 of material which may be identical in all respects to the material from which the rings 46 and 46' previously described are formed from and initially will preferably be of slightly greater diameter than the diameter of the bore in the member in which it is adapted to be received so that the compressive effect thereon will tend to elongate it and acting against the portions 72 will tend to separate them and to cause the ball bearings 76 to be firmly gripped within their respective raceways. Where it is desired not to materially compress the material 78 in assembly in the receiving bore, the dimensions of that portion of the ring 78 between the radially directed surfaces of the end 72 may be initially made slightly greater than the distance between such radially directed surfaces so as to require axial compression of this portion of the ring in assembly about the portion 64, the effect being the same as would be obtained by compressing the ring 78 in assembly in its receiving bore. In any event the two halves of the outer portion 64 will be constantly urged away from one another and thus automatically take up any wear that might develop between the ball bearings 76 and their cooperating races 68 and 74, and at the same time the yieldability of the ring 78 will permit the bushing or bearing to accommodate slight misalignment between the shaft to be received within the member 62 and the walls of the bore in which the ring 78 is to be received.

In the construction illustrated in Fig. 6, and this likewise applies to all of the constructions shown in Figs. 6 to 8 inclusive, and Figs. 11 and 12, inasmuch as the flanges 66 radially overlap the outer portion 64, it will be necessary to form at least one of the flanges 66 after assembly of the two halves of the portion 64 on the inner member 62, and it will be necessary to harden these parts after both flanges 66 have been formed and before the ball bearings 76 have been inserted in position, and accordingly the construction must be arranged to permit such insertion of the ball bearings 76. This is accomplished by providing sufficient axial clearance between the two halves of the outer portion 64 as to permit sufficient axial shifting thereof away from the corresponding flanges 66 as to permit the insertion of the ball 76 after the hardening operation. In other words, after the inner and outer portions have been formed in the manner illustrated in Fig. 6, both halves of the outer portion 64 are shifted axially in one direction to the extent of their movement with respect to the inner portion 62, the balls 76 are inserted in the race 68 thus exposed, both halves of the outer portion 64 are then shifted to their limit of movement in the opposite direction thus uncovering the other race 68 and permitting the insertion of the balls 76 therein, after which the adjacent half of the outer portion 63 is shifted back to retain the balls in such race. Application of the ring 78 thereafter maintains the two halves of the outer portion 64 in properly axially spaced relation thereby preventing accidental displacement of the balls 76.

The construction illustrated in Fig. 7 is identical to that illustrated in Fig. 6 except that the inner portion 62 in this case is provided with an inner ring 80 of suitable non-metallic material which may be identical in all respects to the material from which the outer ring 48 in Figs. 3, 4 and 5 are formed, and the same general benefits will result.

In Fig. 8 a modification is shown in which the split and unsplit portions illustrated in Figs. 6 and 7 are simply reversed in position. In other words this bushing or bearing comprises an outer portion 82 and an inner portion 84, the outer portion 82 being of substantially the same cross-sectional configuration as the inner portion 62 in Fig. 6, and the inner portion 84 comprising two halves each of which is substantially identical in cross-sectional configuration to the two halves of the outer portion 64 in Fig. 6. The outer portion 82 is of generally hollow cylindrical construction radially inwardly flanged at each end as at 86 to provide radially and axially inwardly facing annular raceways 88 for reception of balls 90. Each half of the inner portion 84 comprises a generally hollow cylindrical body portion 92 one end of each of which is radially inwardly and axially outwardly curved as at 94 to provide an annular curved raceway 96 each lying in opposed relation with respect to one of the races 88. The outer portion 82 is provided with an enveloping layer or ring 98 of a material which may be identical to the material of the ring 48 previously described and the inner portion 84 surrounds an inner layer or ring 100 of a material which may be identical to the material from which the ring 46 previously described is formed. As will be readily appreciated the construction illustrated in Fig. 8 will act in substantially the same manner as the construction illustrated in Fig. 7 and assembly and mounting thereof will be accomplished in substantially an identical manner. It will of course be appreciated that where desired the outer ring 98 may be dispensed with and the outer portion 82 fit directly in the bore of the member which is adapted to receive it.

In Fig. 9 a construction is shown which is substantially similar to the construction shown in Fig. 6 and the parts of which are therefore illustrated by the same numerals except that such numerals bear a prime mark, no additional description of the essential elements of the bushing or bearing being necessary under such circumstances. The main difference in the construction shown in Fig. 9 as compared to the construction shown in Fig. 6 is that the internal diameter of the main body portions 70' of each half of the outer portion 64' is relatively greater than in the construction shown in Fig. 6, and one of the end flanges 66' of the inner portion 62' is stopped short of radial overlapping relationship with respect to the inner diameters of the main body portions 70' of the halves of the outer portion 64'. This permits the inner and outer portions 62' and 64' respectively to be completely formed and hardened before assembly, the two halves of the outer portion 64' thus being capable of being slipped over the short flange 66' for assembling purposes. Otherwise the construction is identical to that shown and described in connection with Fig. 6.

In Fig. 10 a construction is shown which differs from the construction shown in Fig. 8 in the same manner that the construction shown in Fig. 9 differs from the construction shown in Fig. 6. The outer ring or layer 98 shown in Fig. 8 however is eliminated in the construction shown in Fig. 10. The various parts shown in Fig. 10 are indicated by the same numerals as employed in connection with Fig. 8 except that such numerals bear a prime mark. In the construction shown in Fig. 10 the external diameter of the main body portions 92' of the two halves of the inner portion 84' is less than for the corresponding members shown in Fig. 8, and at least one flange 86' is limited in its radially inwardly direction so that the opening encompassed thereby is slightly greater in diameter than the external diameter of the main body portions 92' thereby permitting the two halves of the inner portion 84' to be assembled and disassembled from the outer portion 82' after having been completely formed and hardened. It will of course be understood that resort may be had to the features brought out in connection with Figs. 9 and 10 in any of the constructions illustrated in Figs. 6, 7, 8, 11, 12 and 13 shown and described herein.

In Fig. 11 a construction is shown which is identical in all respects save one to the construction illustrated in Fig. 6 and accordingly like parts are illustrated by like numerals and no further description of the essential elements are believed necessary to understand the construction. The only difference between the constructions shown in Fig. 11 and Fig. 6 is that a metallic ring 102 is provided in externally surrounding relationship with respect to the main body portion 70 of the two halves of the outer portion 64. The ring 102 is preferably of a longitudinally split nature so as to enable it to be applied to the outer portion 64 after the balls 76 have been assembled in place. The sleeve 102 is of an axial length substantially equal to the distance between the radially extending portions of the ends 72 so that such portions serve as an abutment for the opposite ends of the ring 102 and thereby limit the amount which the two halves of the outer portion 64 may approach one another in service. The ring 102 is particularly useful in preventing any axial compression and therefore shortening of the ring 78 during insertion of the bushing in the bore intended to receive the same and which shortening might, in unusual cases, be sufficient to permit one of the halves of the outer portion 64 to recede away from the corresponding balls 76 sufficiently to permit their displacement from their intended position.

In Fig. 12 a modified form of construction is shown including an inner portion 62 identical with the inner portion 62 previously described in connection with Figs. 6 and 11, ball bearings 76 the same as in Figs. 6 and 11, and a pair of outer members 104 which are identical to the two halves of the outer portion 64 previously described except that in this case the curved outer end portions 106, corresponding to the portions 72 previously described, terminate at their axially outer ends in radially outwardly directed annular flanges 108. Instead of employing a non-metallic ring or layer such as the ring 78 described in connection with Figs. 6 and 11, in this case an annular metal ring 110 is employed in its place. The ring 110 at each end thereof is provided with a radially inwardly directed flange 112 the outer surface of which abuts against the inner surface of the corresponding flange 108 on the members 104 and thus acts to maintain the members 104 in properly axially spaced condition. The ring 110 will ordinarily be required to be of split conformation to permit its application to the assembly and in some instances it may be desirable that the edges of the ring 110 at the line of split be slightly separated so as to render the ring 110 radially contractible to a limited extent to enhance the ease of insertion of the bushing into the bore intended to receive it. Although the inner portion 62 may be provided with an inner ring such as ring 80 shown and described in connection with Fig. 7, for the purpose of illustration it is shown as being without the same, and where not provided with such ring will be directly receivable upon the shaft 20 or equivalent shaft.

In Fig. 13 a construction is shown which is identical in all respects to the construction shown in Fig. 12 and accordingly identical parts are indicated by identical numerals. The only difference between the construction illustrated in Fig. 13 and the construction illustrated in Fig. 12 is that in the construction illustrated in Fig. 13 a coiled compression spring 114 is provided in surrounding relationship with respect to the cylindrical main body portions of the outer members 104, the opposite ends of the spring abutting against the radially directed outer surfaces of the curved end portions 106 and the spring being maintained under compression therebetween. The spring 114 accordingly constantly urges the portions 104 axially away from one another so as to resiliently grip the ball bearings 76 between the outer and inner portions and automatically take up any play developing between the same because of wear.

In Figs. 14 and 15 a modification is shown which is applicable to any of the constructions previously described except possibly that illustrated in Fig. 11. The construction shown in these two figures is designed to limit relative axial movement between the two axially separated parts of the two-part portions or sleeve members of the assembly. Accordingly, in Figs. 14 and 15 the numeral 120 indicates the one-piece integral portion or sleeve member of any of the previously described constructions, with the possible exception of that illustrated in Fig. 11, and the numerals 122 indicate the halves of the axially separable portions or sleeve assemblies of any of the previously described constructions with the possible exception of that illustrated in Fig. 11. The ring 124 may be either the inner or outer non-metallic ring shown in any of the previously described constructions, depending upon that required to correspond with the ring associated with that portion formed of two axially separable halves. According to the modification illustrated in Figs. 14 and 15 the halves 122 adjacent their opposed ends are each provided with one or more, and preferably three or four, apertures 126 therethrough, the apertures 126 in one of the halves 122 being axially aligned with the corresponding openings 126 in the other half. A U-shaped or hook member 128, illustrated in perspective in Fig. 15, cooperates between each aligned pair of openings 126 in the manner illustrated in Fig. 14, that is with the inwardly bent end portions thereof being received in the corresponding openings 126 of the halves 122. Displacement of the member 128 from operative engagement with the openings 126 is prevented by the ring 124 which maintains the member 128 in position. The ends of the members 128 preferably have a slight amount of play axially in the corresponding openings 126 of the members 122 so as to permit such movement of the members 122 as may be necessary to take up the play between the various ball bearings and their races, but not sufficient to prevent the members 128 from limiting the relative axial movement between the members 122 to such an extent as to permit displacement of the ball bearings from between their races. Limiting the axial displacement between the members 122 also serves in a measure to limit the stress which is imparted to the ring 124 axially thereof when the bushing or bearing assembly is being applied to a shaft or inserted in a bore, depending upon whether the ring 124 is on the inside of said assembly.

Formal changes may be made in the specific embodiments of the invention disclosed without departing from the spirit or substance of the broad invention, the scope of which is commensurate with the appended claims.

What I claim is:

1. A bearing assembly comprising in combination, inner and outer metallic sleeve-like portions each of substantially equal wall thickness throughout its length arranged in concentric and generally radially spaced relation, one of said members being of one-piece integral construction, a pair of axially spaced radially offset portions on said one-piece portion forming a pair of axially spaced raceways, the other of said sleeve portions comprising a pair of separable halves arranged in axially concentric and spaced relation, each half including a radially offset portion forming a raceway lying in opposed relation with respect to one of the first mentioned raceways and providing a radially directed shoulder of the sides thereof opposite said raceway thereof, rolling anti-friction elements between each opposed pair of said raceways, and a radially yieldable ring member formed for complementary engagement with the shoulders of both of said halves cooperatively associated with both of said halves, said ring being so constructed and arranged as to maintain per se the properly assembled relation of said assembly and so that radial compression thereof tends to effect relative axial movement between said halves whereby to cause said halves to more firmly engage said rolling anti-friction elements, said ring also adapted to frictionally lock both said halves to a supporting part therefor.

2. A bearing assembly comprising in combination, a pair of sleeve-like portions arranged in concentric and generally radially spaced relation, one of said sleeve-like portions comprising a one-piece integral member and the other thereof comprising a pair of axially spaced circular members movable axially relative to one another, said members formed to provide two axially spaced pairs of raceways between them, rolling anti-friction members confined between said raceways, radially directed shoulder portions on said other of said sleeve-like portions, a ring of yieldable non-metallic material associated with that surface of said other of said sleeve-like portions opposite the raceways thereof and formed for direct complementary engagement with both such shoulders, the internal and external diameters of said ring immediately adjacent said shoulders being respectively smaller and greater than the internal and external diameters of said ring over the remaining portions thereof.

3. A bearing assembly comprising in combination, a one-piece integral sleeve member having radially directed flanges at opposite ends thereof forming a pair of axially spaced raceways, a pair of sleeve members arranged in telescoping relation with respect to the first mentioned sleeve member and with their opposed ends in axially spaced relation, each of said pair of sleeve members having adjacent one end thereof a radially offset portion forming an annular raceway lying in opposed relation with respect to one of the raceways on the first mentioned sleeve member, rolling anti-friction elements between each opposed pair of said raceways, at least one of said flanges on the first mentioned sleeve member having an external diameter less than the internal diameter of said pair of raceways whereby to permit said pair of raceways to be axially applied and removed from the first mentioned sleeve member, and a radially yieldable ring member cooperating between said radially offset portions of said pair of sleeve members to limit relative axial movement therebetween in at least one direction and tending to pre-load said anti-friction elements between their corresponding said races.

4. In a bearing assembly, in combination, a one-piece integral sleeve member having a radially directed portion adjacent each end thereof forming an annular raceway, a second sleeve member comprising a pair of substantially similar sleeve members arranged in axially opposed and spaced relation and in telescoping relation with respect to the first mentioned sleeve member, each of said pair of sleeve members having a radially offset portion adjacent an end thereof each forming an annular raceway lying in opposed relation with respect to one of the raceways of the first mentioned sleeve member, rolling anti-friction elements confined between each opposed pair of said raceways, said pair of sleeve members being initially relatively movable with respect to each other between said radially directed portions of the first mentioned sleeve member an amount sufficient to permit insertion and removal of said rolling anti-friction members from between opposed pairs of said raceways, and a ring interposed between said radially offset portions of said pair of sleeve members normally maintaining said sleeve members in axially spaced relation and against relative axial approach with respect to each other.

5. A bearing assembly including, in combination, a one-piece integral sleeve member, a flange at each end of said sleeve member forming an annular raceway, a pair of sleeve members arranged in generally axially spaced relation and in telescoping relation with respect to the first mentioned sleeve member, a radially offset portion on each of said pair of sleeve members forming a raceway lying in opposed relation with respect to one of the raceways of the first mentioned sleeve member, rolling anti-friction elements interposed between each opposed pair of raceways, and annular means maintained under a compressive stress between said axially offset portions of said pair of members constantly urging said pair of members apart in axially opposite directions.

6. A bearing assembly including, in combination, a one-piece integral sleeve member, a flange at each end of said sleeve member forming an annular raceway, a pair of sleeve members arranged in generally axially spaced relation and in telescoping relation with respect to the first mentioned sleeve member, a radially offset portion on each of said pair of sleeve members forming a raceway lying in opposed relation with respect to one of the raceways of the first mentioned sleeve member, rolling anti-friction elements interposed between each opposed pair of raceways, means interposed between said radially offset portions positively limiting axial approach of said pair of sleeve members relative to one another, and annular means maintained under a compressive stress between said axially offset portions of said pair of members constantly urging said pair of members apart in axially opposite directions.

7. A bearing element comprising, in combination, an inner sleeve portion and an outer sleeve portion arranged in concentric and generally radially spaced relationship, one of said portions formed to provide a pair of axially spaced annular raceways, the other of said portions comprising a pair of axially spaced and separable parts each of which is formed to provide an annular raceway arranged in opposed relation with respect to one of said raceways of the first mentioned portions, rolling anti-friction elements confined between each opposed pair of said raceways, and a ring portion of resilient and readily distortable non-metallic material, said ring portion and said other portion being arranged in telescoping relationship with one embraced within the other, and said ring portion engaging both said parts of said other portion and urging both said parts simultaneously in an axial direction to preload said anti-friction elements between their said raceways and to maintain both said portions and said elements in an assembled unit applicable to and removable from a supporting part as such, and said ring portion being adapted to frictionally secure said other portion against relative rotation to a supporting part by direct engagement therewith.

8. A bearing element comprising, in combination, an inner sleeve portion and an outer sleeve portion arranged in concentric and generally radially spaced relationship, one of said portions formed to provide a pair of axially spaced annular raceways, the other of said portions comprising a pair of axially spaced and separable parts each of which is formed to provide an annular raceway arranged in opposed relation with respect to one of said raceways of the first mentioned portion, rolling anti-friction elements confined between each opposed pair of said raceways, and a ring portion of relatively soft rubber, said ring portion and said other portion being arranged in telescoping relationship with one embraced within the other and said ring portion engaging both said parts of said other portion and urging both said parts simultaneously in an axial direction to preload said anti-friction elements between their said raceways and to maintain both said portions and said elements in an assembled unit applicable to and removable from a supporting part as such, and said ring portion being adapted to frictionally secure said other portion against relative rotation to a supporting part by direct engagement therewith.

9. A bearing assembly comprising, in combination, inner and outer metallic sleeve-like portions arranged in concentric and generally radially spaced relation, one of said members being of rigid non-separable construction, a pair of axially spaced radially offset portions on the first mentioned portion forming a pair of axially spaced bearing races, the other of said sleeve portions comprising a pair of axially spaced and separable halves arranged in axially concentric relation, each half including a radially offset portion forming a bearing race lying in opposed relation with respect to one of the first mentioned races and each providing a radially directed shoulder of the side thereof opposite said race thereof, rolling anti-friction elements between each opposed pair of races, and a ring of relatively soft rubber of a length approximating that of said other portion arranged in telescoping relationship with respect to said other portion, said ring being engaged with said shoulders of both said halves of said other portion and bearing thereagainst to resiliently urge said halves in a direction to compress said rolling anti-friction elements between their corresponding said races, said ring also serving to maintain the assembled relationship of said portions and elements when otherwise unsupported and adapted to frictionally lock both halves of said other portion against relative rotation with respect to a supporting part for said ring.

JESS D. CHAMBERLIN.